United States Patent
Ho

(10) Patent No.: US 6,995,340 B1
(45) Date of Patent: Feb. 7, 2006

(54) PORTABLE OVEN

(76) Inventor: Wei-The Ho, 10F,No.380,Sec.1,Fu-Hsing South Rd., Taipei (TW)

( * ) Notice: Subject to any disclaimer, the term of this patent is extended or adjusted under 35 U.S.C. 154(b) by 0 days.

(21) Appl. No.: 11/052,872

(22) Filed: Feb. 9, 2005

(51) Int. Cl.
*F24C 1/16* (2006.01)
*F24C 7/10* (2006.01)
*A47J 37/06* (2006.01)

(52) U.S. Cl. .................... 219/386; 219/524; 99/449; 126/38; 126/9 R

(58) Field of Classification Search .................. None
See application file for complete search history.

(56) References Cited

U.S. PATENT DOCUMENTS

| | | | |
|---|---|---|---|
| 3,172,999 A * | 3/1965 | Sutton et al. ............... | 219/524 |
| 3,746,837 A * | 7/1973 | Frey et al. .................. | 219/387 |
| 4,884,499 A * | 12/1989 | Rensch et al. ................ | 99/449 |
| 6,513,515 B1 * | 2/2003 | Wu ............................. | 126/38 |
| 6,776,085 B1 * | 8/2004 | Tang .......................... | 219/524 |
| 6,802,308 B1 * | 10/2004 | Nugent et al. ................ | 126/38 |

* cited by examiner

*Primary Examiner*—Joseph Pelham
(74) *Attorney, Agent, or Firm*—Rosenberg, Klein & Lee

(57) ABSTRACT

A portable oven includes a foldable cooker and a chassis, and the foldable cooker has two symmetric sets of heating boxes, each having an electric heater installed therein and connected to an external power supply for producing heat, and a replaceable cooking utensil placed above the electric heater, so that when the electric heater is on, different ways of cooking can be accomplished. An axle is installed between the two heating boxes; the two heating boxes can be folded together for an easy carry after its use; a lock device is installed above the chassis and below the cooker to secure the opened oven onto the chassis for cooking.

15 Claims, 15 Drawing Sheets

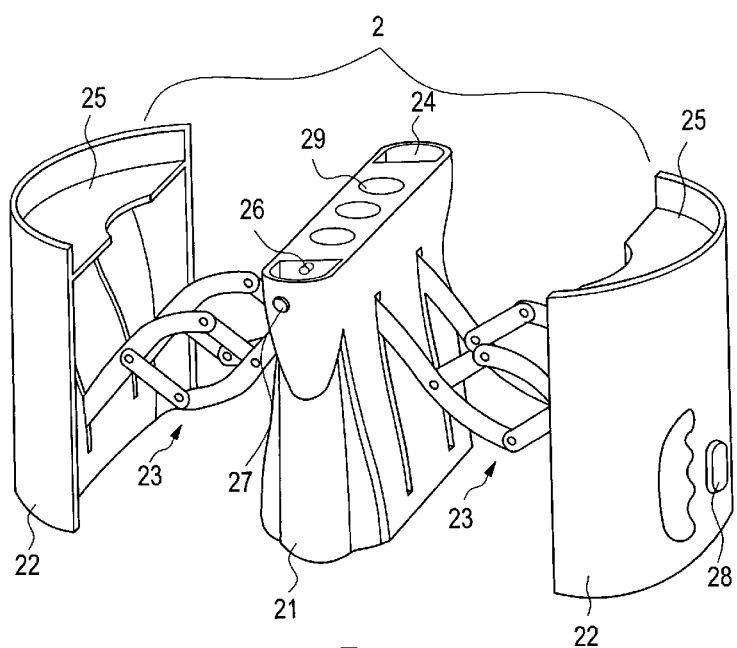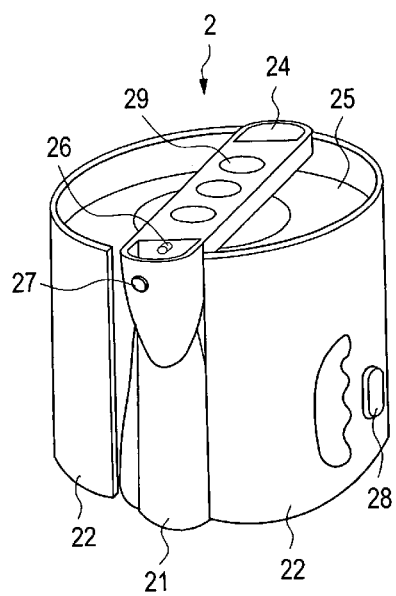
*FIG.5*  *FIG.6*

PORTABLE OVEN

BACKGROUND OF THE INVENTION

1. Field of the Invention

The present invention generally relates to a portable oven, and more specifically to an oven for cooking steaks, teppanyakis, hotdogs, hamburgers, and other different foods, which facilitates its cleaning, oil collection, environmental protection and economic way of use.

2. Description of the Related Art

As physical life is enhanced, people pay more attentions to the quality of life and expect to adjust the fast pace of our life by having leisure activities. People nowadays often have leisure activities, and barbeque is considered as one of the most favorable activities, not only relaxes ourselves, but also allows us to taste delicious food.

However, a traditional barbeque activity requires lots of preparation for various barbeque tools such as a barbeque stand and charcoals, in addition to the preparation of food. Although these things are not difficult to get, yet different kinds of cooking require different equipments. Therefore, the whole barbeque activity may turn into a totally unhappy event if preparation is done properly, which not only ruins the mood of having fun, but also causes unnecessary arguments among friends.

Further, lots of garbage or waste oils are remained after a conventional barbeque activity is held, and such activity definitely causes pollutions to the environment after a period of time, and thus not complying with the requirements of environmental protection.

In view of the foregoing shortcomings, the inventor of the present invention designed a comprehensive stove that integrates various cooking utensils, and such stove must be simple-to-use, easy-to-carry, and also in compliance with the requirements of environmental protection, and finally invented a portable oven after conducing extensive researches and experiments.

SUMMARY OF THE INVENTION

It is a primary objective of the present invention is to provide a portable oven which requires a simple operation for carrying out various kinds of barbeque activities.

Another objective of the present invention is to provide a portable oven having a light and small size which is easy to carry, not only can be transported by sport utility vehicles, but also can be stored in a small area at home to maximize its values.

A further objective of the present invention is to provide a portable oven that is in compliance with the requirements of environmental protection, easy to clean and convenient to collect waste oils so as to leave cleaning problems after an enjoyable activity.

To achieve the foregoing objectives, the portable oven comprises a foldable cooker and a chassis, wherein the foldable cooker have two symmetric sets of heating boxes, each heating box having an electric heater installed therein and driven by an external power supply and installs different cooking utensils as to achieve the functions of cooking steaks, teppanyakis, hotdogs and hamburgers. Further, the waste cooking oil can be collected easily and the condiments for cooking can be accessed conveniently. An axle is installed between the two heating boxes, and the two heating boxes can be taken apart and stacked with each other after use. A handle is installed separately on the external distal ends of the two heating boxes, so that when the two heating boxes are combined, the handle can be held by hands to facilitate its carry. Further, the chassis can be spread open or folded to give a convenient way for transportation and storage. If the chassis is spread open, the foldable cooker can be placed on top of the chassis for cooking.

BRIEF DESCRIPTION OF THE DRAWINGS

FIG. 5 is a schematic view of the structure of a deluxe chassis being spread open according to the present invention;

FIG. 6 is a schematic view of the structure of a deluxe chassis being folded according to the present invention;

DETAILED DESCRIPTION OF THE PREFERRED EMBODIMENTS

The technical characteristics of the present invention will become apparent in the following detailed description with reference to the accompanying drawings of an embodiment which serves as a preferred embodiment; however, such preferred embodiment is not intended to limit the scope of the present invention.

To make it easier for our examiner to understand the objective of the invention, its structure, innovative features, and performance, we use a preferred embodiment together with the attached drawings for the detailed description of the invention.

Figure 1:
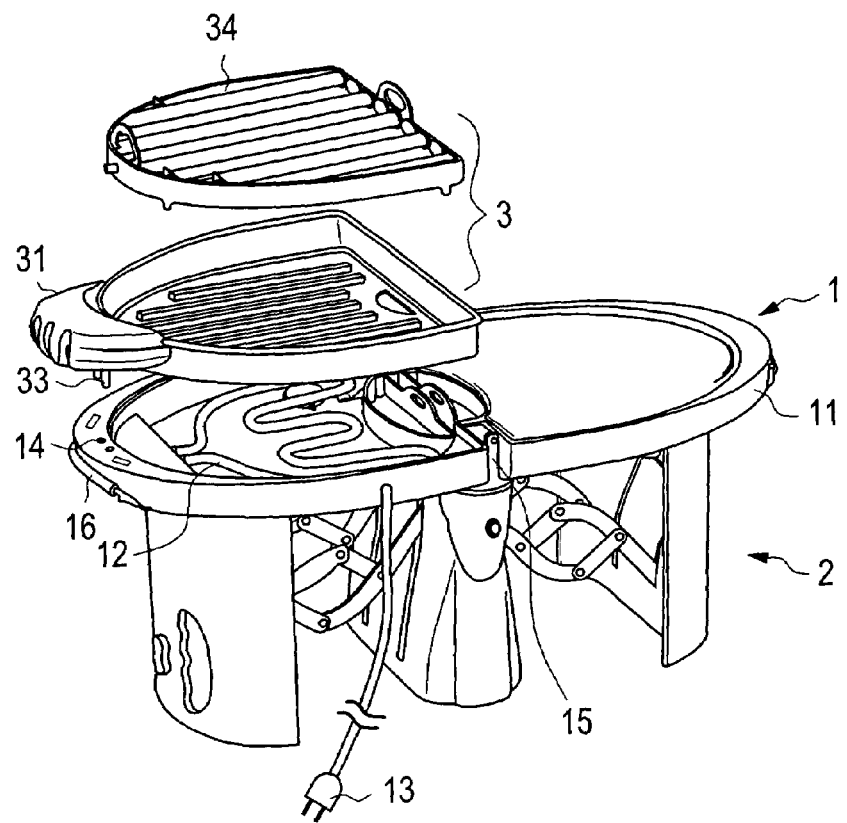
FIG. 1 is a view of a preferred embodiment of the present invention.
Figure 2:
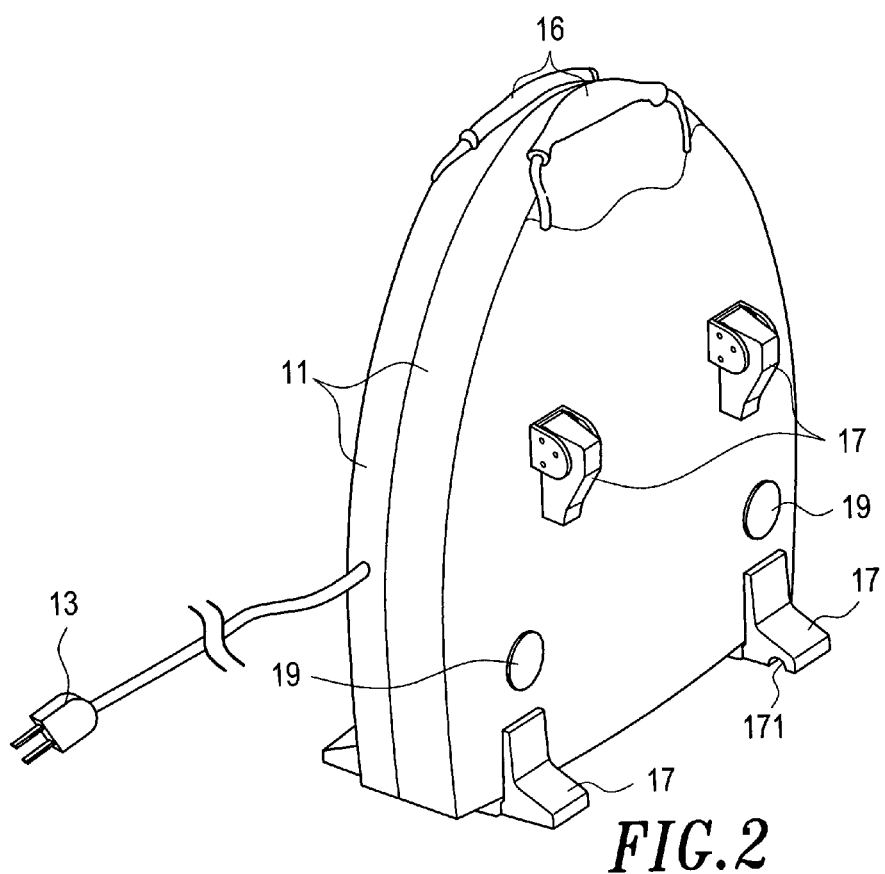
FIG. 2 is a schematic view of a folded cooker according to the present invention.
Figure 2A:
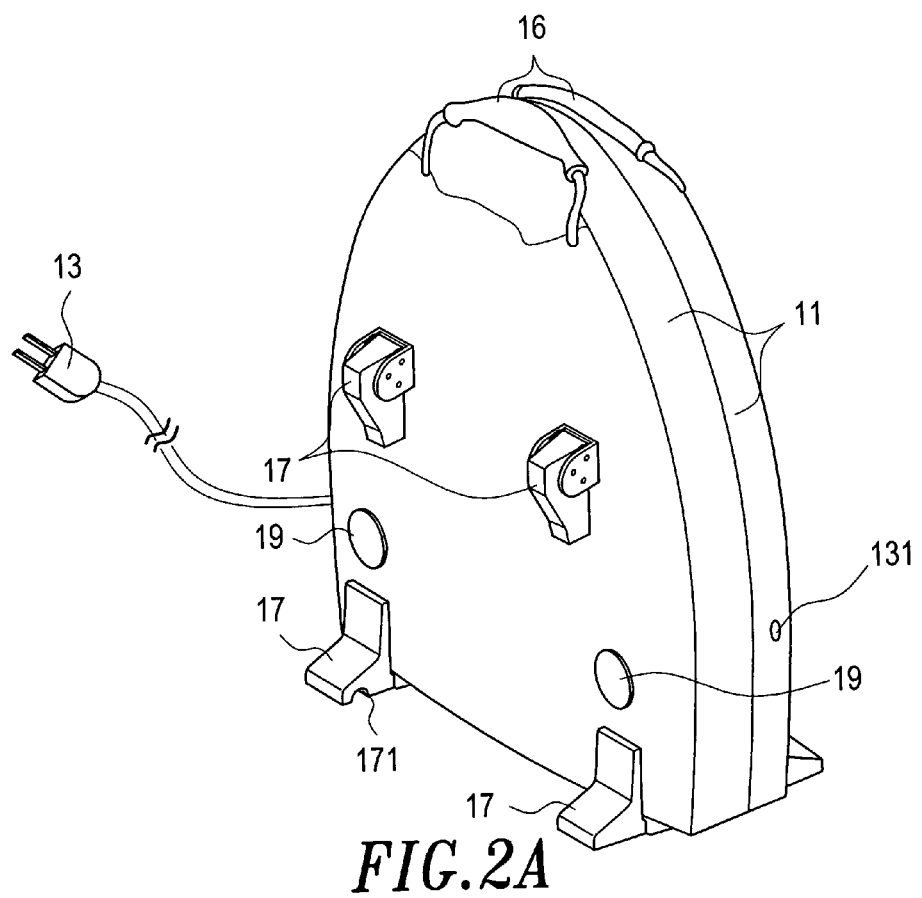
FIG. 2A is a schematic view with a 180 degree rotation of FIG. 2 that illustrates the power indicating lamp according to the present invention.

Referring to FIGS. 1, 2 and 2A, the present invention comprises a foldable cooker 1 and a chassis 2, wherein the cooker 1 can be spread open and fixed onto the chassis 2, and then a power supply is connected to provide different various cooking functions.

The foregoing cooker 1 includes two symmetrical sets of heating boxes 11, each having an electric heater 12 installed therein, and its power cable 13 is installed next to the heating boxes 11 and proximate to the connecting position of the two heating boxes. A power indicating lamp 131 is installed on a lateral side of the cooker opposite to the power cable 13 as shown in FIG. 4A, and a replaceable cooking utensil 3 is placed above the electric heater 12. After the power cable 13 is inserted and connected, the electric heater 12 is driven to produce heat to carry out different cooking actions by the different cooking utensils.

Figure 3:
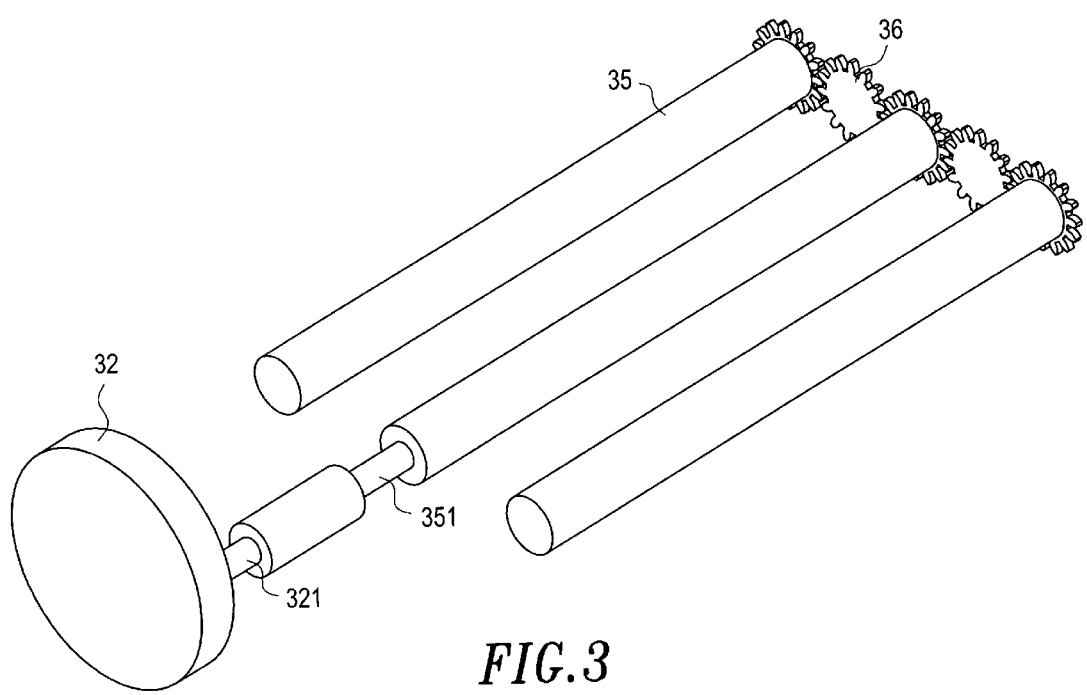
FIG. 3A is a view illustrating the principle of the movement of a hotdog broiler according to the present invention.

Referring to FIG. 3, the cooking utensil 3 of this preferred embodiment could be a hotdog broiler, and the hotdog broiler comprises a base 31 and a motor 32 installed inside an end of the base 31, and the motor 32 is eccentrically installed at an output axle 321 to facilitate the installation of the motor 32, and a power plug 33 is protruded downward and corresponds to a power socket 14 disposed at a surface of the cooker 1, and a hotdog stand 31 is disposed on the base 31, and the hotdog stand 31 has a plurality of rotary pipes 35, and the pipes 35 are coupled with each other by a gear 36, such that all of the pipes 35 are rotated in the same direction and one of the pipes 351 is extended outside the hotdog stand 34 and latched to an output axle 321 of the motor 32 when being placed into the base 31. If the motor is rotated, the gear 35 synchronously drives each pipe 35 to rotate and carry out the function of broiling hotdogs.

Figure 4:
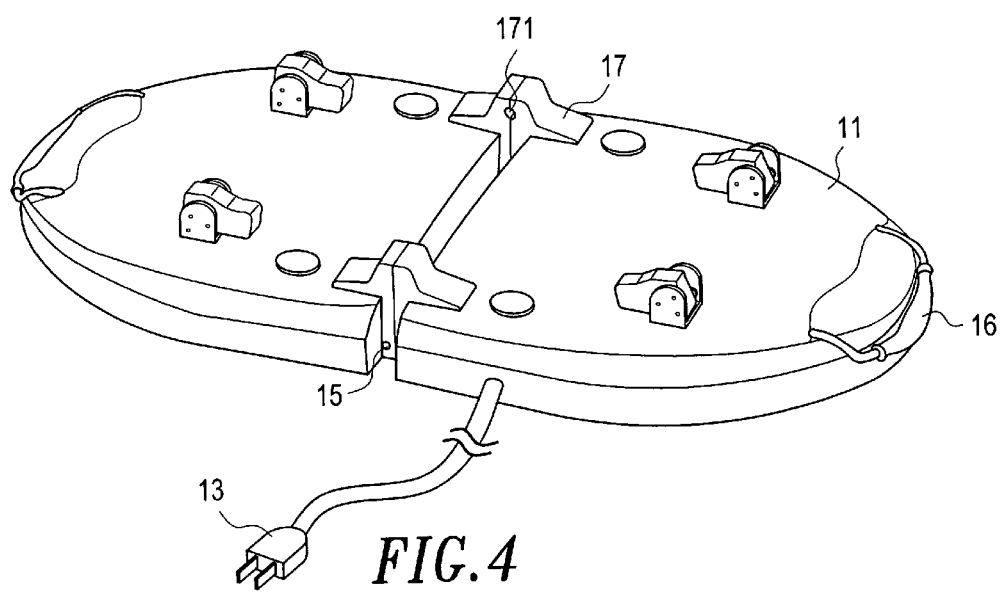
FIG. 4 is a perspective view of the cooker being spread open according to the present invention.

Referring to FIGS. 2 and 4, an axle 15 is installed between the two heating boxes 11, and the two heating boxes 11 can be separated and stacked with each other after use, and a handle 16 is installed at an external end of the two heating boxes 11. After the two heating boxes are engaged with each other, the handle 16 can be held for facilitating its carry.

Figure 5A:
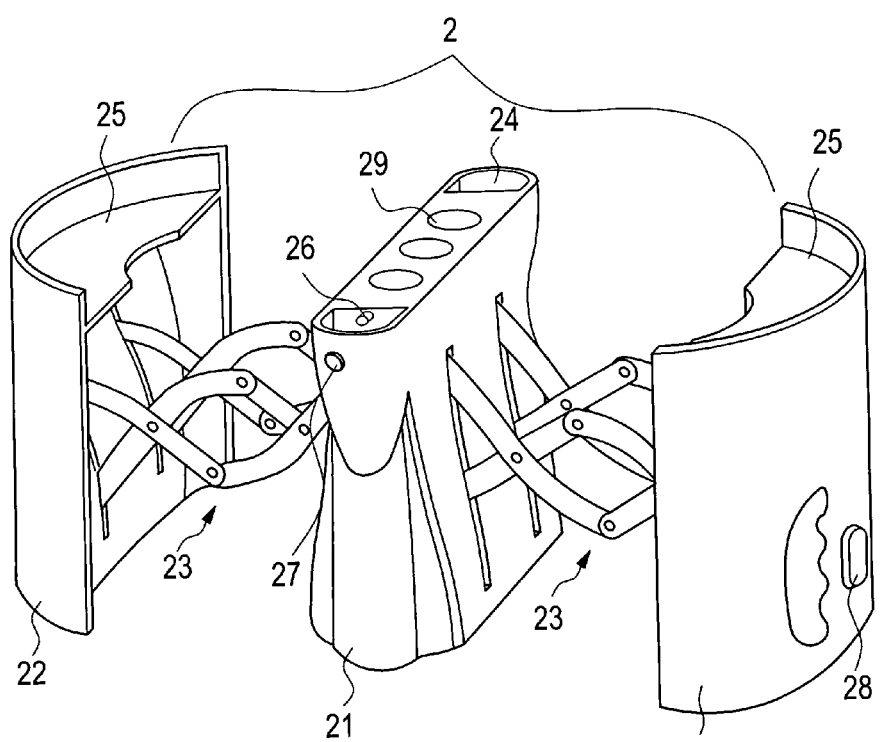
FIG. 5A is a schematic view of a rotary stand of a deluxe chassis being spread open in X-shape according to the present invention.

Referring to FIGS. 5 and 6, the chassis 2 is of a deluxe design comprising a primary support base 21; wherein the primary support base 21 has a symmetrical lateral support base 22 separately disposed on both sides, and the two lateral support bases 22 are coupled with the primary support base 21 by a rotary stand 23, and the rotary stand 23 can be X-shaped as shown in FIG. 5, such that the two lateral support bases 22 can be attached to the primary support base 21 for an convenient carry or can be spread open for disposing the cooker 1, and the primary support base 21 has a positioning hole 24, and the two lateral support bases 22 have a positioning groove 25 and a positioning pillar 17 correspondingly protruded from the back of the cooker 1 that is latched into the positioning hole 24 or the positioning groove 25 respectively.

The foregoing positioning hole 24 has a limit pillar 26 protruded from the positioning hole 24, and a latch hole 171 is disposed on the positioning pillar 17 corresponding to the cooker 1, such that the latch hole 171 is latched into the limit pillar 26 for enhancing the positioning effect.

Figure 7:
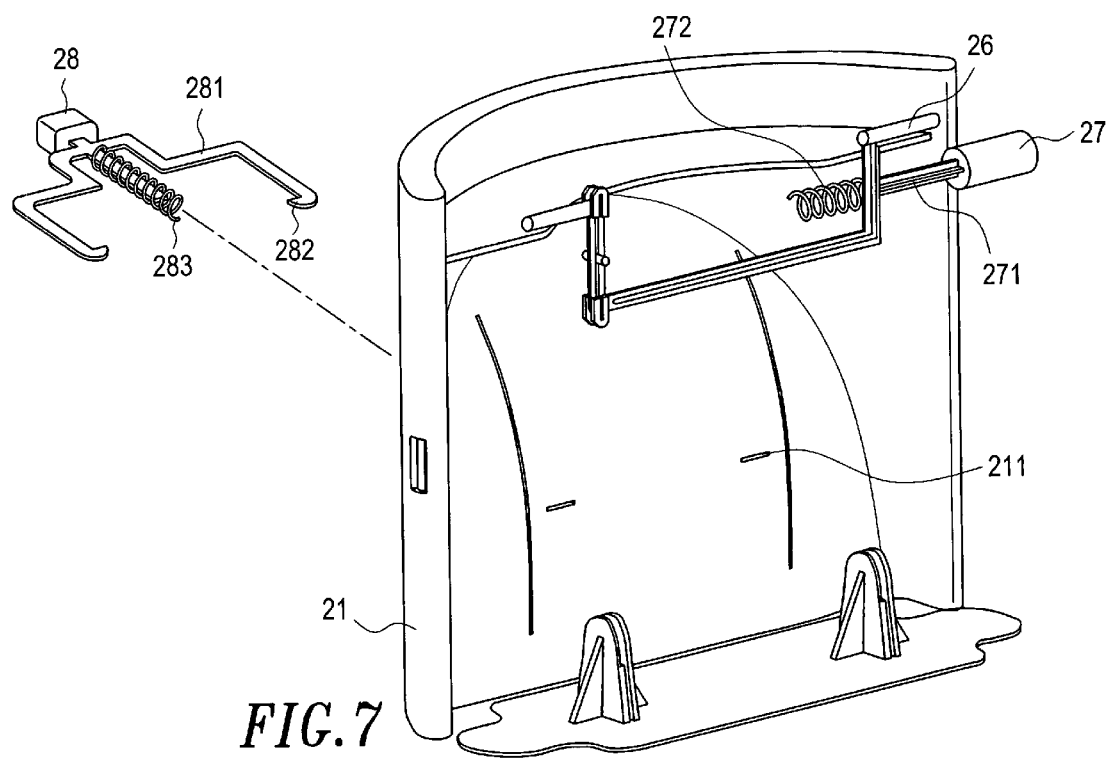
FIG. 7 is a view illustrating the principle of the movement of a limit pillar of a primary support base according to the present invention.
Figure 8:
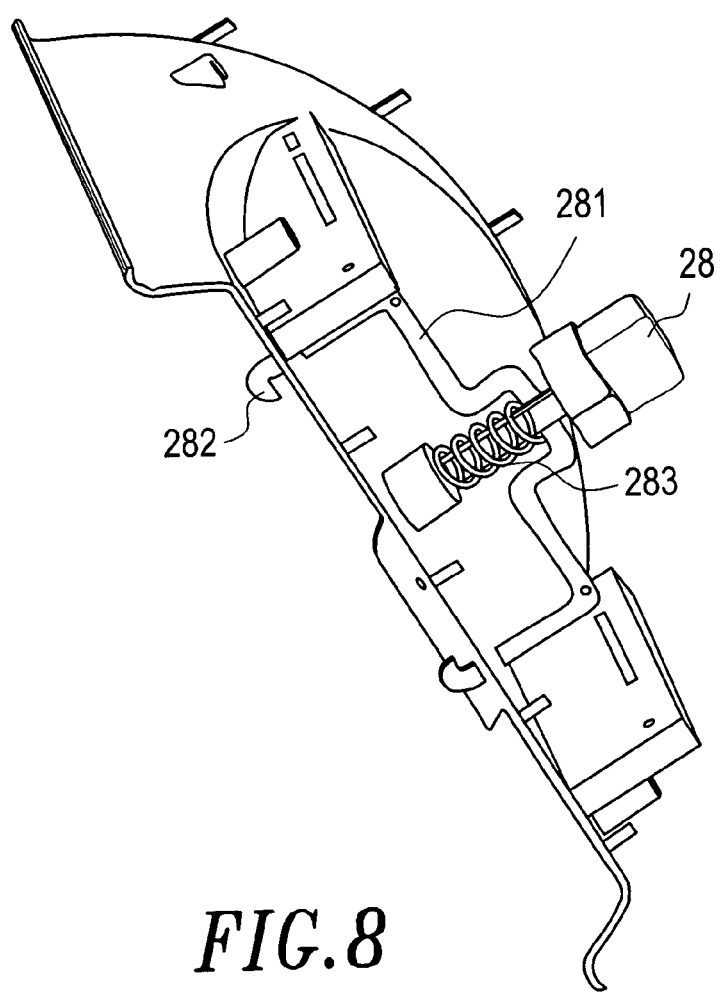
FIG. 8 is a view of the principle of the movement of latching a latch handle a lateral support base according to the present invention.

Referring to FIGS. 7 and 8, the primary support base 21 comprises a press button 27 disposed on one side of the primary support base 21, and the press button 27 drives a link rod 271, and the link rod 271 connects the limit pillar 26 and controls the limit pillar 26 to be withdrawn into the primary support base 21 for facilitating an installation or removal of the cooker 1, and the press button 27 and the wall of the primary support base 21 have a spring 272, such that when the press button 27 is released, the limit pillar 26 resumes its original position by the resilience of the spring 272.

Further, the lateral support base 22 comprises a press button 28 at its external side, and the press button 28 pushes a latch handle 281, and both ends of the latch handle 281 have a latch hook 282, and a latch hole 211 is disposed on the corresponding sides of the primary support base 21 for fixing the latch hook 282 into the latch hole 211. When the press button 28 is pressed, both ends of the latch handle 281 are pressed to shift outward, so that the lateral support bases 22 are detached from the primary support base 21. After the press button is released, the latch hooks 282 disposed on both ends of at handle 281 resume their original positions by the resilience of the spring 283 to achieve the locking effect.

Figure 9:
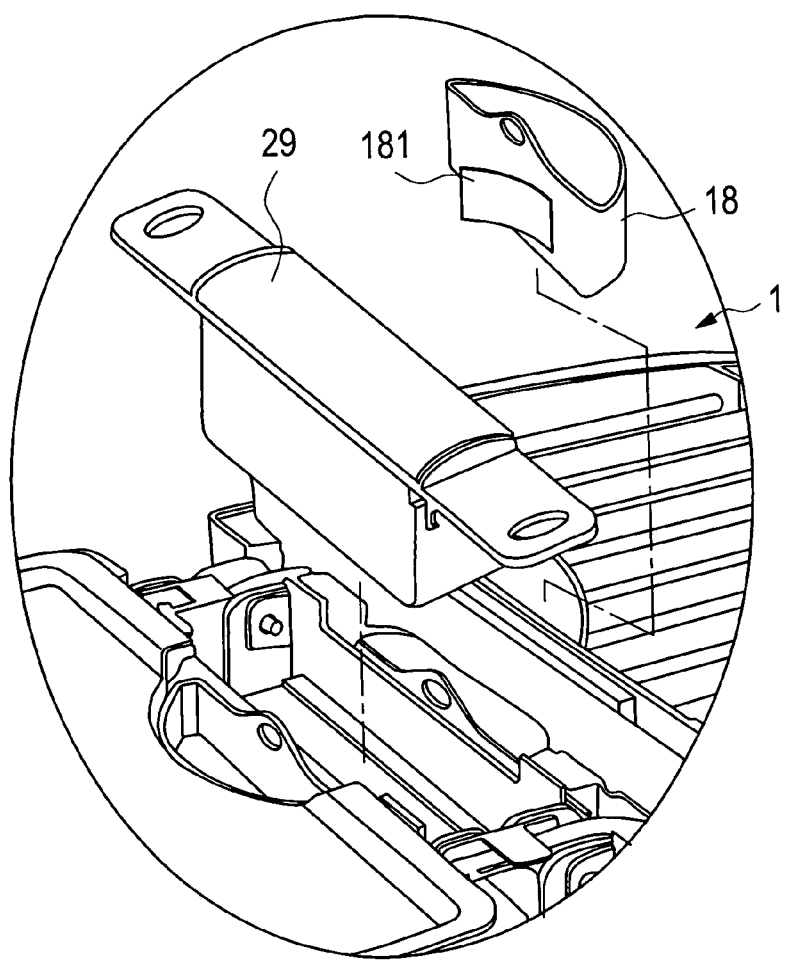
FIG. 9 is a view of the installation of a condiment box and an oil collecting box according to the present invention.

Referring FIGS. 5, 6, and 9, the primary support base 21 comprises a condiment box 28 for placing condiments and accessing a condiment from the connecting position of said two heating boxes 11. The condiment box 29 can be installed at the connecting space of the two heating boxes 11, and an oil collecting box 18 is disposed proximate to an end of said axle 15, and the height of the oil collecting box 18 does not exceed the bottom of the cooking utensil 3 for facilitating an oil collection; and a bracket 181 is disposed on one side of the oil collecting box 18 for latching a wall of the heating box 11 and preventing the oil collecting box 18 from shaking.

Figure 10:
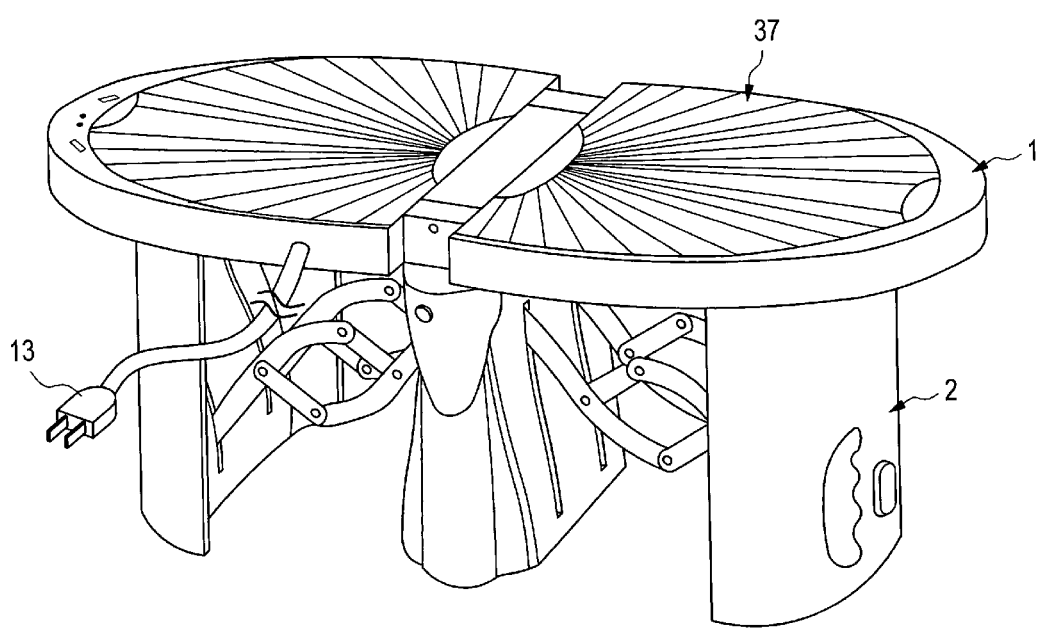
FIG. 10 is a view of the installation of a grill for cooking steaks according to the present invention.
Figure 11:
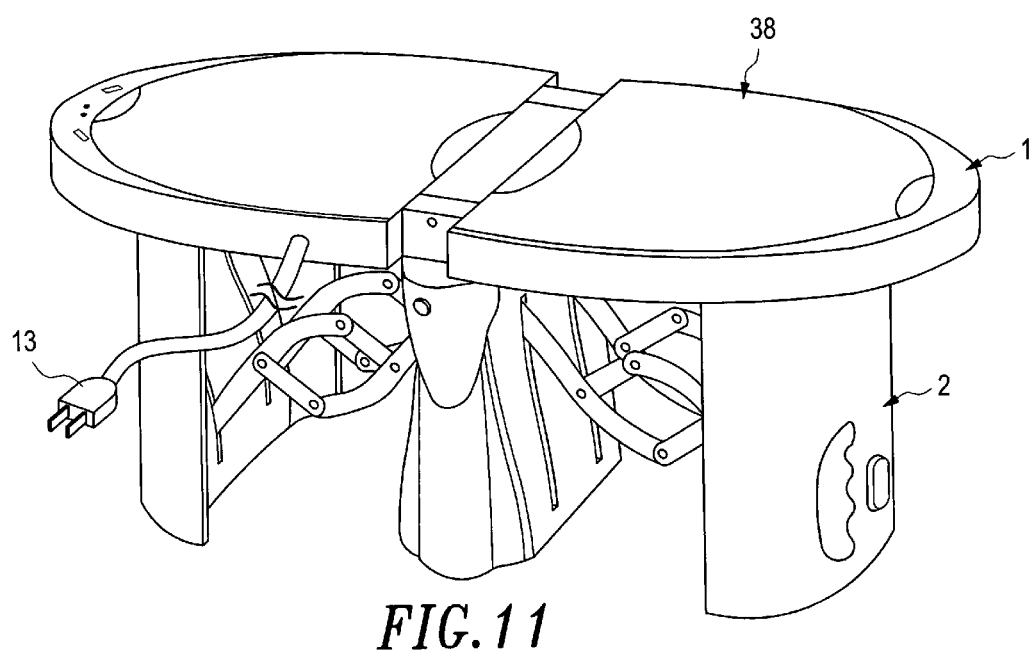
FIG. 11 is a view of the installation of an iron plate for teppanyakis according to the present invention.

Referring to FIGS. 10 and 11, the cooking apparatus 3 could be a grill 37 for cooking steaks or an iron plate for teppanyaki so as to maximize the cooking function.

Figure 12:
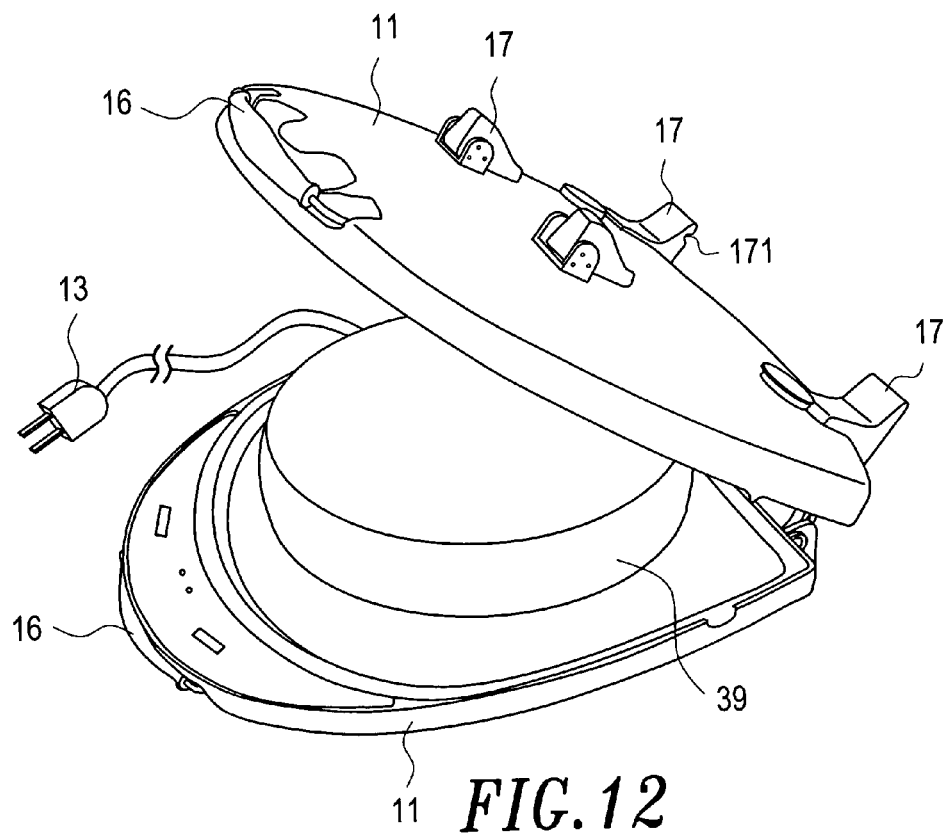
FIG. 12 is a view illustrating the principle of the actions of cooking hamburgers according to the present invention.
Figure 12A:
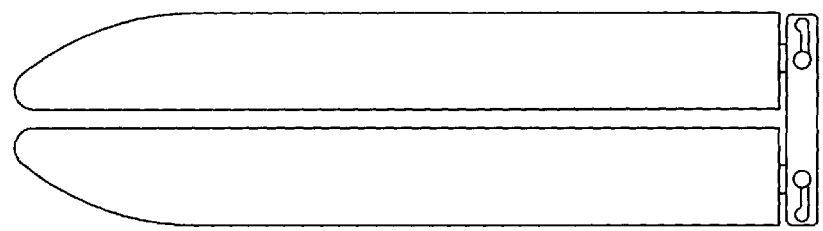
FIG. 12A is another view illustrating the principle of the actions of cooking hamburgers according to the present invention.
Figure 12B:
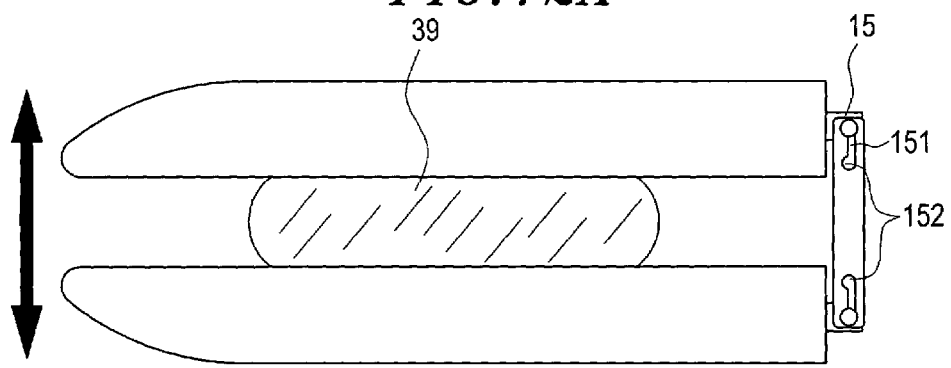
FIG. 12B is another further view illustrating the principle of the actions of cooking hamburgers according to the present invention.

Referring to FIG. 12, the two heating boxes 11 can be combined for clamping and cooking a hamburger 39, or the axle 15 disposed between the two heating boxes 11 can be adjusted as shown in FIGS. 12 and 12A; wherein a positioning point 152 is disposed separately on both ends of an adjusting gap 151 for latching the axle 15 to the positioning point 152 on the corresponding external side, such that a space is maintained for clamping and cooking a hamburger 39 when the two heating boxes 11 are combined with each other.

Figure 13:
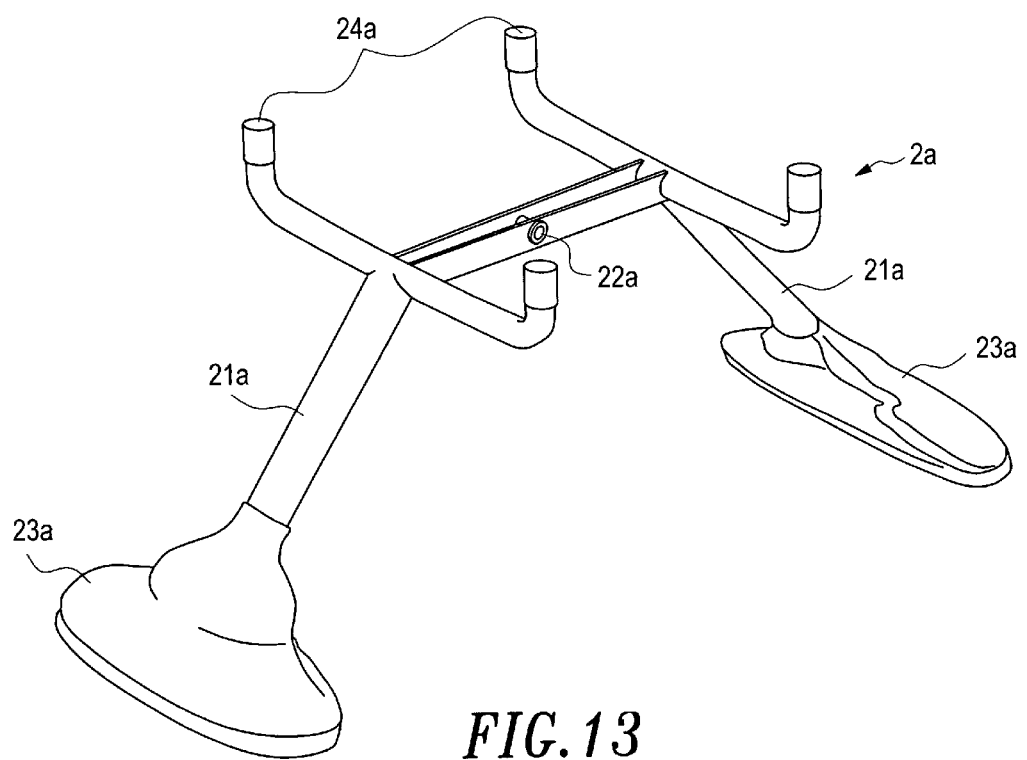
FIG. 13 is a schematic view of the structure of a simple support stand according to the present invention.

Referring to FIGS. 2 and 13, the present invention comprises another simple foldable chassis 2a, and the chassis 2 has two symmetric support rods 21a, and the two support rods 21a are connected by an axle 22a, and the two support rods 21a have a strong footer 23a underneath. When the support rods 21a are spread open, the support rods 21a having a protruded pillar 24a is installed in a corresponding concave hole 19 under the cooker 1, such that the protruded pillar 24a is propped and fixed into the concave hole 19, and the footers 23a provide the required support.

The description and its accompanied drawings are used for describing preferred embodiments of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable oven, comprising:
   a foldable cooker, having two symmetric sets of heating boxes, each heating box having an electric heater installed therein, a power cord being installed next to said heating boxes, a replaceable cooking utensil being disposed above said electric heater, and an axle being installed between said two heating boxes, and said two heating boxes are taken apart and stacked with each other to facilitate its carry after use; and a chassis, having a lock device separately disposed on a top of said chassis and a bottom of said cooker for mounting said ovens onto said chassis for use.

2. The portable oven of claim 1, wherein said cooker is a steak grill.

3. The portable oven of claim 1, wherein said cooker is an iron plate used for teppanyaki.

4. The portable oven of claim 1, wherein said cooker is a hotdog broiler comprising a base, a motor installed inside an end, a power plug protruded downward and corresponding to a power socket at a surface of said cooker, a hotdog stand disposed on said base, and said hotdog stand has a plurality of rotary pipes, and said pipes are coupled with each other by a gear, such that all of said pipes rotate in the same direction and one of said pipes is extended outside said hotdog stand and latched to an output end of said motor when being placed into said base.

5. The portable oven of claim 1, wherein said heating box comprises an oil collecting box disposed proximate to an end of said axle, and the height of said oil collecting box does not exceed the bottom of said cooker for facilitating an oil collection; and a bracket disposed on one side of said oil collecting box for latching a wall of said heating box and preventing said oil collecting box from shaking.

6. The portable oven of claim 1, wherein said two heating boxes have a condiment box disposed at a position where said two heating boxes are coupled for placing condiments.

7. The portable oven of claim 1, wherein said cooker has a power indicating lamp disposed on a side of said cooker.

8. The portable oven of claim 1, wherein said two heating boxes have a handle disposed on an external distal end for carrying by holding said handle when said two heating boxes are engaged.

9. The portable oven of claim 1, wherein said axle disposed between said two heating boxes has an adjustable axial distance, such that a space is maintained for clamping and cooking a hamburger when said two heating boxes are engaged.

10. The portable oven of claim 1, wherein said chassis is a simple foldable stand comprising a protruded pillar at its top when said chassis is spread out, and a concave hole correspondingly disposed under said cooker for fixing said protruded pillar into said concave hole.

11. The portable oven of claim 1, wherein said chassis comprises a primary support base, and said primary support base has a symmetrical lateral support base separately disposed on both sides, and said two lateral support bases are coupled with said primary support base by a rotary stand, such that said two lateral support bases can be attached to said primary support base for an convenient carry or can be spread open for disposing said cooker, and said primary support base has a positioning hole, and said two lateral support bases have a positioning groove and a positioning pillar correspondingly protruded from the back of said cooker being latched into said positioning hole or said positioning groove respectively.

12. The portable oven of claim 11, wherein said positioning hole has a limit pillar protruded from said positioning hole, and a latch hole disposed on said positioning pillar corresponding to said cooker, such that said latch hole is latched into said limit pillar for enhancing a positioning effect.

13. The portable oven of claim 11, wherein said primary support base comprises a press button disposed on one side, and said press button drives a link rod, and said link rod couples and controls said limit pillar to withdraw into said primary support base, and said press button and the wall of said primary support base have a spring, such that when said press button is released, said limit pillar resumes its original position by the resilience of said spring for facilitating an installation or removal of said cooker.

14. The portable oven of claim 11, wherein said lateral support base comprises a press button, and said press button pushes a latch handle, and both ends of said latch handle have a latch hook, and a latch hole is disposed on the corresponding sides of said primary support base for fixing said latch hook into said latch hole, and when said press button is pressed, both ends of said latch handle are pressed to shift outward, so that said lateral support bases are detached from said primary support base, and a spring is installed between said press button and said lateral support base for recovering the position of said latch after said spring is released.

15. The portable oven of claim 1, wherein said primary support base comprises a condiment box for accessing a condiment from the connecting position of said two heating boxes.

* * * * *